Nov. 30, 1954  D. TATE  2,695,553
POLARIZING FILTER DEVICE FOR STEREOSCOPIC CAMERA
Filed May 2, 1950
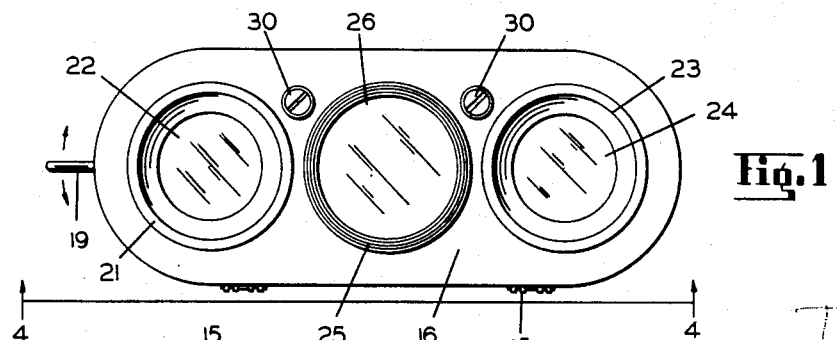
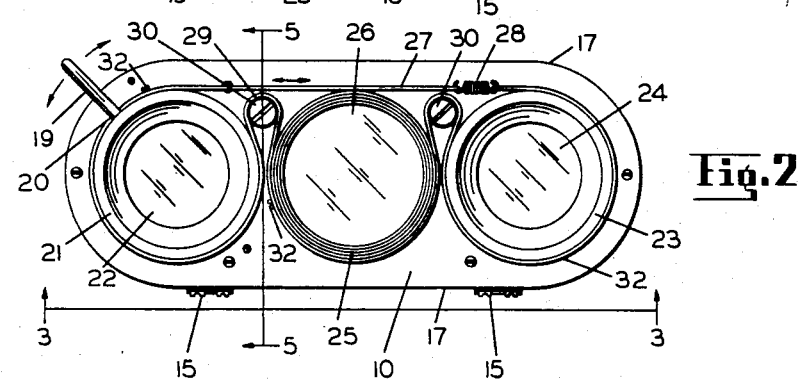
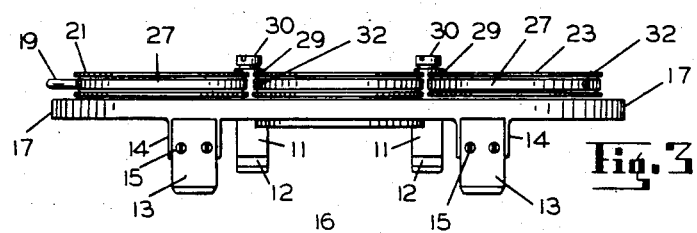
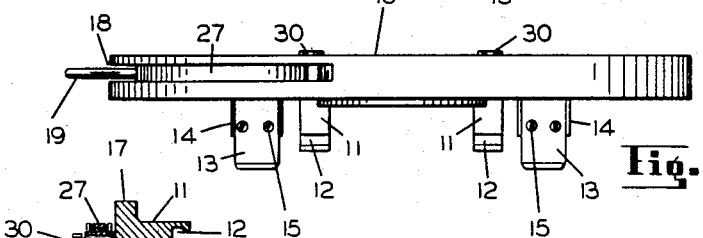
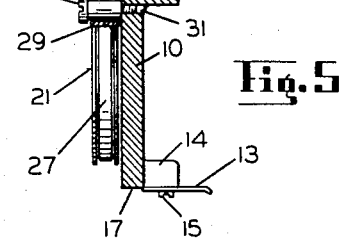
INVENTOR.
DONALD TATE
BY
*Christian R Nielsen*
Attorney United States Patent Office 2,695,553
Patented Nov. 30, 1954

2,695,553

POLARIZING FILTER DEVICE FOR STEREOSCOPIC CAMERAS

Donald Tate, Milwaukee, Wis., assignor to David White Company, Milwaukee, Wis.

Application May 2, 1950, Serial No. 159,527

3 Claims. (Cl. 95—18)

My invention relates to a polarizing filter synchronizing device and more particularly to a device for synchronously adjusting polarizing filters adapted for alignment with the taking lenses of a stereoscopic camera and with the viewfinder lens.

An object of my invention is to provide a filter mounting which comprises a pair of photographic filters rotatably mounted in combination with a view finder lens whereby polarizing filters may be rotatably adjusted in synchronized manner by the movement of a single lever.

Another object is to insure maintenance of parallel axes of polarizing filters for stereoscopic cameras while providing a third synchronized polarizing filter for the viewfinder to permit visual study of the polarizing effects effected by synchronous adjustment of the filters.

As is well known, polarizing filters may be used to lighten or darken the sky as reproduced on film and to accentuate or decrease reflected glare from objects. While some rules of thumb are available for estimating the effect of polarizing filters it is generally better to judge the effect by eye through a filter as it is rotated. The present device provides a polarizing filter for the viewfinder and insures proper adjustment of the filters over the taking lenses when the desired effect is observed through the viewfinder.

Other objects and advantages will be pointed out in, or be apparent from, the specification and claims, as will obvious modifications of the single embodiment shown in the drawings, in which:

Figure 1 is a front view of the assembled enclosure with the two photographing filters equally spaced on both sides of a centrally disposed viewer lens.

Figure 2 is a front view of the assembled device with the front cover portion removed showing the actuating band and the adjustment lever.

Figure 3 is an end view of the device as shown in Figure 2 taken at the line 3—3 in Figure 2.

Figure 4 is an end view of the device as shown in Figure 1, taken at the line 4—4 in Figure 1, and Figure 5 is a cross-sectional view of the device taken at the line 5—5 in Figure 2.

Similar characters of reference indicate corresponding parts throughout the several views, and referring now to the same, the character 10 shows a back plate equipped with outwardly extending attaching members 11 which are provided with lateral grooves 12 which are designed for engagement with the camera (not shown), and the resilient spring plates 13 attached to the integrally constructed supports 14 by means of screws 15, or in any other convenient manner, are disposed near the bottom of the plate 10. The attaching members 11 and the resilient spring plates 13 permit easy attachment of the plate 10 to the face of the camera unit.

There is a cover plate 16 which frictionally engages the outer peripheral surface 17 of the plate 10 and acts as a cover for the entire assembled unit. The cover plate 16 is provided with a latch 18 disposed in radial fashion on the outer wall for the engagement of an outwardly extending lever 15 which is attached at 20 to a circular mounting 21 which supports a polarizing filter 22, and there is a similar circular mounting 23 supporting a polarizing filter 24. Both of these mountings are similarly attached in rotatable fashion to the back plate 10 and as the mountings 21 and 23 with the two lenses 24 and 25 respectively are placed in direct alignment with the photographic lenses of the camera, the entire unit is clamped to the face of the camera. Another filter mounting 25 is rotatably attached to the back plate 10 between the mountings 21 and 23. This lens mounting 25 supports the view finder filter shown as 26 which is in direct alignment with the view finder in the camera, and by adjusting the filters so that the glare disappears in the view finder, the filters will all be adjusted correctly.

There is a flat band 27 of flexible material such as bronze or tempered steel, which is held in frictional engagement with a portion of the outer periphery of the lens mountings 21, 23 and 25, by means of the spring tension of the spring 28 which is attached to both ends of the band 27 as shown in Figure 2.

The band 27 extends over a pair of rollers 29 rotatably mounted on screws 30 which threadedly engage the flat plate 10 at 31. These screws 30 are attached to the back plate 10 between the mountings 21 and 25 at 23 and 25, at a point above the center of the filters, and the band 27 is attached to the various filter holders 21, 23 and 25 by means of small screws shown as 32 which prevent the band 27 from slipping on the peripheral surface of the filter holders during the adjustment process.

In operation, the entire unit is attached to the front of the camera by means of the springs 13 and the grooves 12 in the top member 11. This will bring the filters 22 and 24 in direct alignment with the photographic lenses in the camera, and the viewer lens 26 in direct alignment with the viewer in the camera.

All filters are of the polarizing type. By moving the lever 19 either up or down as indicated by the arrows, it will cause the band 27 to move and thereby adjust the polarizing filters in a synchronized manner to obtain the desired effect. The attachment of the band 27 to the filter mountings 21, 23 and 25 by means of the screws 32 will move them through the same arc in the same direction due to the rollers 29 mounted on the screws 30 guiding the band 27.

The device permits simple adjustment of all of the filters with but a single movement of the lever, and although I have shown a particular and specific construction and arrangement of the parts constituting the device, I am fully cognizant of the fact that many changes may be made in the form and arrangement of the component parts without affecting their operativeness or without departing from the spirit of my invention or the scope of the appended claims.

Having thus described my invention, what I claim and desire to secure by Letters Patent in the United States is:

1. A polarizing filter device for a stereoscopic camera having a pair of taking lenses and a view finder window, comprising, a plate having two apertures adapted to align with the taking lenses and a third aperture adapted to align with the viewfinder, a filter holder aligned with each aperture and rotatably mounted on the plate, a polarizing filter in each holder, and means positively interconnecting said holders for synchronous rotation to maintain the polarizing axes of the filters parallel at all times.

2. A device according to claim 1 in which said means comprises, an endless flexible member trained around a substantial portion of the periphery of each of said holders, and means preventing slippage between said member and said holders.

3. A device according to claim 1 in which said means comprises, an endless flexible member attached to each of said holders, and guide means disposed between the view finder filter holder and each of said taking lens filter holders and over which the flexible member is trained for imparting a loop to the flexible member between adjacent filter holders to provide contact between said flexible member and the holders over a greater portion of the periphery of said holders.

References Cited in the file of this patent

UNITED STATES PATENTS

| Number | Name | Date |
|---|---|---|
| 2,408,772 | Glasser | Oct. 8, 1946 |
| 2,453,180 | Bachelder | Nov. 9, 1948 |
| 2,527,106 | Smith | Oct. 24, 1950 |